US005508820A

United States Patent [19]

Kabeya

[11] Patent Number: 5,508,820
[45] Date of Patent: Apr. 16, 1996

[54] FACSIMILE MACHINE INCLUDING A DEVICE FOR SELECTIVELY CHANGING THE RECORDING SPEED

[75] Inventor: Shozo Kabeya, Anjyo, Japan

[73] Assignee: Brother Kogyuo Kabushiki Kaisha, Japan

[21] Appl. No.: 254,701

[22] Filed: Jun. 6, 1994

[30] Foreign Application Priority Data

Jun. 4, 1993 [JP] Japan .................................. 5-160428

[51] Int. Cl.$^6$ .............................. H04N 1/36; H04N 1/32; H04N 1/21
[52] U.S. Cl. ......................... 358/404; 358/412; 358/468; 358/296
[58] Field of Search ..................... 358/404, 406, 358/412, 434, 439, 468, 304, 444, 296

[56] References Cited

U.S. PATENT DOCUMENTS

| 4,672,460 | 6/1987 | Tsuda | 358/404 |
| 4,712,139 | 12/1987 | Kato | 358/404 |
| 4,774,590 | 9/1988 | Haganuma et al. | 358/444 |
| 5,359,429 | 10/1994 | Takahashi | 358/404 |

FOREIGN PATENT DOCUMENTS

| 54-3419 | 1/1979 | Japan . |
| 54-80021 | 6/1979 | Japan . |
| 57-148467 | 9/1982 | Japan . |
| 2131663 | 5/1990 | Japan . |

Primary Examiner—Edward L. Coles, Sr.
Assistant Examiner—Kimberly A. Williams
Attorney, Agent, or Firm—Oliff & Berridge

[57] ABSTRACT

A facsimile machine has: a reception unit for receiving image data transmitted from a remote facsimile machine at a fixed reception speed; a first memory for temporarily storing the image data supplied from the reception unit; a decoding unit for decoding the image data retrieved from the first memory into record data; a second memory for temporarily storing the record data obtained by the decoding unit; a recording unit for performing a recording operation for each cut sheet with the record data, at a recording speed having a value corresponding to the reception speed; a memory unoccupied area amount detection unit for detecting at least one of the amount of a remaining memory area in the first memory unoccupied by the image data and the amount of a remaining memory area in the second memory unoccupied by the record data; and a recording speed changing unit for selectively changing the value of the recording speed to another value faster than the value when at least one of the first memory unoccupied area amount and the second memory unoccupied area amount detected by the memory unoccupied area amount detection unit is equal to or less than corresponding one of first and second predetermined threshold values, the recording speed changing unit controlling the recording unit to perform the recording operation for each cut sheet at the selectively changed recording speed.

11 Claims, 5 Drawing Sheets

FACSIMILE MACHINE INCLUDING A DEVICE FOR SELECTIVELY CHANGING THE RECORDING SPEED

BACKGROUND OF THE INVENTION

1. Field of the Invention

The present invention relates to a facsimile machine for recording transmitted or copied images on cut sheets. More particularly, the present invention relates to a facsimile machine of a type which temporarily stores, in a memory, image data representative of the images desired to be recorded, before performing a recording operation with the image data onto cut sheets.

2. Description of the Related Art

Conventionally, a typical facsimile machine is capable of encoding and transmitting image data of a document read by a reading unit in a transmission mode. In reception mode, incoming image data is temporarily stored in an image data memory before being decoded and developed into record data in the form of dot data. The record data is then temporarily stored in a record data memory before being sequentially recorded in line increments on a record sheet such as a cut sheet or a roll paper.

In a facsimile machine of a type that can record on cut sheets, such as A4 or letter size sheets as the record sheet, recording processes are possible at several different recording speeds. An operator can select one of the several different recording speeds. Image data is transmitted from a remote facsimile machine at a transmission speed corresponding to the selected recording speed. Image data representative of several pages of document are sequentially transmitted from a remote facsimile machine and are first stored in an image data memory. Image data are sequentially retrieved at one-line increments from the image data memory to be decoded into line image data. The thus-prepared line image data are further developed into line record data in the form of dot data before being stored in a record data memory. A cut sheet is supplied to the recording unit of the facsimile machine and transported therethrough at a predetermined pitch for every line increment of record data retrieved from the record data memory and recorded on the sheet. When the entire sheet is recorded on, recording processes of the facsimile machine are interrupted, the sheet in the recording unit is discharged onto a discharged sheet tray of the facsimile machine, and a new cut sheet is supplied to the recording unit.

However, there has been known a problem with the above-described facsimile machine in that each time recording of a cut sheet is completed, the recording processes are interrupted while discharge of the completed sheet and supply of a new sheet are executed consecutively. During the period that the recording processes are interrupted, the image data for respective line images are sequentially retrieved from the image data memory, decoded and developed into the line record data, and then stored into the record data memory. The amount of the record data thus stored in the record data memory increases until remaining capacity in the memory unoccupied by the record data becomes so low that encoding and developing processes are interrupted. Because the image data are intermittently transmitted from the remote facsimile to be stored in the image data memory, the amount of the image data put into the image data memory becomes greater than the amount taken out for decoding and developing processes. As a result, the amount of image data stored in the image data memory increases until finally the image data memory becomes full.

The image data memory also becomes full when decoding or developing processes of image data are complicated. In this case, the data amount stored in the image data memory increases while the complicated decoding or developing processes are being performed. Especially when the record data memory is almost fully filled with the record data, the remaining capacity in the memory unoccupied by the record data is so low that the decoding or developing process are frequently interrupted. As a result, the image data memory is more liable to become full.

When the facsimile machine is not provided with an error correction mode (ECM) function, the full image data memory will cause a transmission error because flow control of transmission of the image data can not be performed. Therefore, the full image data memory will cause reception of incoming image data to be cut off.

SUMMARY OF THE INVENTION

It is therefore an object of the present invention to overcome the above-described drawbacks, and to provide a facsimile machine that can prevent cut offs of incoming image data caused by the image data memory being full.

In order to attain the above object and other objects, the present invention provides a facsimile machine which is capable of recording of images on cut sheets at an increased recording speed when an area in at least one of the image data memory and the record data memory unoccupied by the corresponding data is reduced to a corresponding certain level.

The present invention therefore provides a facsimile machine, capable of receiving image data from a remote facsimile machine representative of an image of at least one page of document and recording the image of the at least one page of document onto at least one cut sheet, comprising: reception means for receiving image data representative of an image of at least one page of document transmitted from a remote facsimile machine at a fixed reception speed; first memory means for temporarily storing the image data supplied from the reception means; decoding means for decoding the image data retrieved from the first memory means into record data; second memory means for temporarily storing the record data obtained by the decoding means; recording means for performing a recording operation for each of at least one cut sheet with the record data, at a recording speed having a value corresponding to the reception speed, to thereby record the image of the at least one page of document onto the at least one cut sheet, respectively; memory unoccupied area amount detection means for detecting at least one of the amount of a remaining memory area in the first memory means unoccupied by the image data and the amount of a remaining memory area in the second memory means unoccupied by the record data; recording speed changing means for selectively changing the value of a recording speed, at which the recording means performs the recording operation for each of at least one of the at least one cut sheet, to another value faster than the value when at least one of the first memory unoccupied area amount and the second memory unoccupied area amount detected by the memory unoccupied area amount detection means is equal to or less than corresponding one of first and second predetermined threshold values, the recording speed changing means controlling the recording means to perform the recording operation for corresponding one of the at least one of the at least one cut sheet, at the selectively changed recording speed.

The memory unoccupied area amount detection means may detect at least one of the amount of the remaining memory area in the first memory means and the amount of the remaining memory area in the second memory means, immediately before when the recording means performs the recording operation for each of the at least one of the at least one cut sheet. The recording speed changing means may selectively change the value of the recording speed, at which the recording means performs the recording operation for the corresponding one of the at least one of the at least one cut sheet, to the another value faster than the value when at least one of the first memory unoccupied area amount and the second memory unoccupied area amount detected by the memory unoccupied area amount detection means is equal to or less than the corresponding one of the first and second predetermined threshold values, the recording speed changing means controlling the recording means to perform the recording operation for the corresponding cut sheet at the selectively changed recording speed.

The recording speed changing means may include comparing means for comparing at least one of the detected first memory unoccupied area amount and the second memory unoccupied area amount with the corresponding one of the predetermined first and second threshold values.

The facsimile machine may further comprise: speed value storing means for storing a plurality of different values of the recording speed; first threshold value storing means for storing a plurality of different values of the first threshold value which correspond to the plurality of different values of the recording speed, respectively; second threshold value storing means for storing a plurality of different values of the second threshold value which correspond to the plurality of different values of the recording speed, respectively; and initially setting means for initially setting one of the plurality of different values as the recording speed, at which the recording means performs the recording operation, the initially setting means controlling the reception means to receive the image data from the remote facsimile machine at the reception speed corresponding to the initially set value, the initially setting means controlling the comparing means of the recording speed changing means to compare the detected first memory unoccupied area amount with one of the plurality of values of the first threshold values corresponding to the initially set value of the recording speed and to compare the second memory unoccupied area amount with one of the plurality of values of the second threshold values corresponding to the initially set value of the recording speed, the recording speed changing means selectively changing the initially set value of the recording speed to another value that is another one of the plurality of values stored in the speed value storing means faster than the initially set value when at least one of the detected first memory unoccupied area amount and second memory unoccupied area amount is equal to or less than the corresponding value of the first and second predetermined threshold values.

According to another aspect, the present invention provides a facsimile machine, capable of receiving from a remote facsimile machine image data representative of images of a plurality of pages of document and recording the images of the plurality of pages of document onto a plurality of cut sheets, comprising: recording speed setting means for setting a recording speed into an initial set value; receiving means for consecutively receiving image data representative of the images of a plurality of pages of document transmitted from a remote facsimile machine at a reception speed corresponding to the initial set value of the recording speed; first memory means for temporarily storing the image data consecutively received by the receiving means; processing means for consecutively retrieving, from the first memory means, the image data representative of respective ones of a plurality of line images constituting each of the plurality of pages of document and for processing the image data into line image data; second memory means for temporarily storing the line image data for each one of the plurality of line images constituting each of the plurality of pages of document; retrieving means for consecutively retrieving, from the second memory means, the line image data for respective ones of the plurality of line images constituting each of the plurality of pages of document; recording means for consecutively recording the respective ones of the plurality of line images constituting each of the plurality of pages of document, onto a corresponding one of the plurality of cut sheets, in accordance with the corresponding line image data, at the recording speed; judging means for judging whether the amount of the area in the first memory means occupied by the image data has a value equal to or higher than a first predetermined value, immediately before when the recording means starts recording an image of each of at least one of the plurality of pages of document onto a corresponding one of the plurality of cut sheets; and recording speed resetting means for resetting the recording speed, at which the recording means records the respective ones of the plurality of line images constituting corresponding one of the at least one of the plurality of pages of document onto a corresponding one of the at least one of the plurality of cut sheets, from the initial set value into a value higher than the initial set value while maintaining the reception speed to be fixed, if the judging means determines that the amount of the area of the first memory means occupied by the image data has the value equal to or higher than the first predetermined value.

According to a further aspect, the present invention provides a facsimile machine, capable of receiving image data from a remote facsimile machine representative of images of at least one page of document and recording the images of the at least one page of document onto at least one cut sheets, comprising: reception means for receiving image data representative of images of at least one page of document transmitted from a remote facsimile machine at a fixed reception speed; first memory means for temporarily storing the image data representative of an image of at least one page of document supplied from the reception means; decoding means for decoding the image data retrieved from the first memory means into record data; second memory means for temporarily storing the record data obtained by the decoding means; recording means for performing a recording operation for each of at least one cut sheet with the record data, at a recording speed corresponding to the reception speed, to thereby record the image of the at least one page of document onto the at least one cut sheet, respectively; memory unoccupied area amount detection means for detecting at least one of the amount of a remaining memory area in the first memory means unoccupied by the image data and the amount of a remaining memory area in the second memory means unoccupied by the record data, immediately before when the recording means starts performing the recording operation for each of at least one of the at least one cut sheet; recording speed changing means for selectively changing the recording speed, at which the recording means performs the recording operation for the corresponding one of the at least one of the at least one cut sheet, from the value corresponding to the reception speed to another value faster than the value, if at least one of the first memory unoccupied area amount and the second memory unoccupied area amount detected by the memory unoccupied area amount detection means is equal to or less than corresponding one of the first and second predetermined threshold values, the recording speed changing means controlling the recording means to perform the recording operation for the corresponding cut sheet at the selectively changed recording speed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

Figure 1:
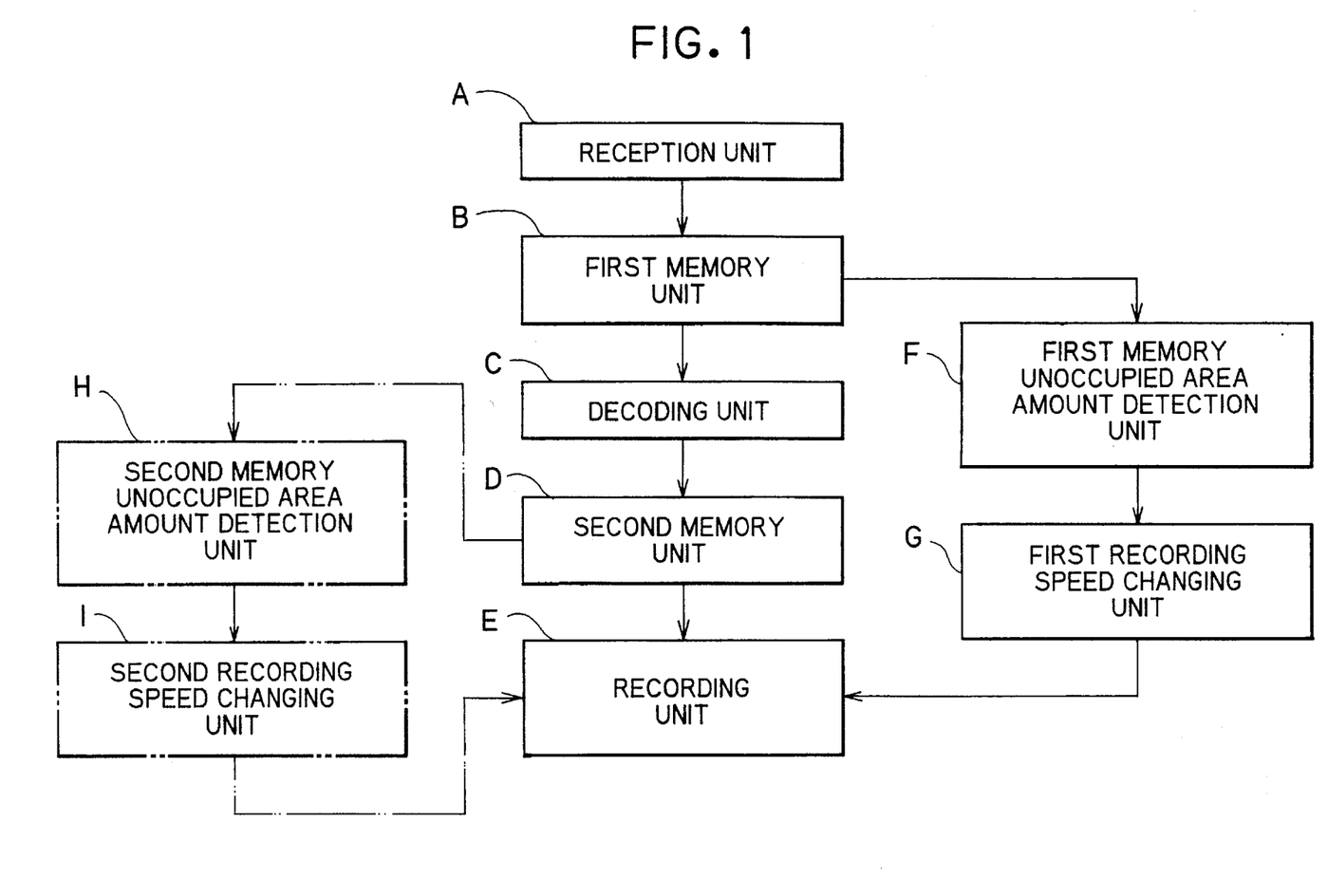
FIG. 1 is a block diagram schematically showing the structure of a facsimile machine of the present invention.

First, a facsimile machine of the present invention will be briefly described below with reference to FIG. 1.

The facsimile machine of the present invention mainly includes: a reception unit A, a first memory unit B, a decoding unit C, a second memory unit D, a recording unit E, a first memory unoccupied area amount detection unit F, and a first recording speed changing unit G. The reception unit A receives coded image data transmitted from a remote facsimile machine at a reception speed. The first memory unit B temporarily stores image data supplied from the reception unit A. The decoding unit C decodes the image data retrieved from the first memory unit B into record data. The second memory unit D temporarily stores the record data produced by the decoding unit C. The recording unit E is provided for performing a recording operation for each cut sheet, with the record data retrieved from the second memory unit D, at a recording speed. Because the record data represents respective line images to be recorded on the corresponding cut sheet, the recording unit E sequentially records the respective line images in accordance with the corresponding record data. The recording unit E performs the recording operation, at a recording speed initially selected by an operator from a plurality of recording speeds. It is noted that the reception unit A receives the image data from the remote facsimile, at the reception speed corresponding to the initially selected recording speed.

According to the present invention, the first memory unoccupied area amount detection unit F detects the amount of the remaining memory area in the first memory unit B unoccupied by the image data. More specifically, the detection unit F calculates the amount of the remaining memory area, based on the data amount of the image data presently stored in the first memory unit B and the memory capacity of the first memory unit B. The first recording speed changing unit G receives the result of the remaining memory area amount detected by the unit F. The unit G controls the recording unit E to selectively change the initially selected recording speed to a faster recording speed when the remaining memory area amount is equal to or less than a first predetermined threshold value. The unit G performs its recording speed changing operation, with respect to the recording operation to be attained by the recording unit D for each cut sheet. More specifically, immediately before the recording unit E performs its recording operation for each cut sheet, the unit F detects the amount of the remaining memory area presently unoccupied by the image data in the memory unit B. The unit G then controls the recording unit E to perform the recording operation for the corresponding cut sheet, with the selectively changed recording speed.

The facsimile machine of the present invention may be further provided with a second memory unoccupied area amount detection unit H, and a second recording speed changing unit I. The second memory unoccupied area amount detection unit H detects the amount of the remaining memory area in the second memory unit unoccupied by the image data. More specifically, the detection unit H calculates the amount of the remaining memory area, based on the data amount of the record data presently stored in the second memory unit D and the memory capacity of the second memory unit D. The second recording speed changing unit I receives the result of the remaining memory area amount detected by the unit H. The unit I controls the recording unit E to selectively change the initially selected recording speed to a faster recording speed when the remaining memory area amount is equal to or less than a second predetermined threshold value. The unit I performs its recording speed changing operation, with respect to the recording operation to be attained by the recording unit D for each cut sheet. More specifically, immediately before the recording unit D performs its recording operation for each cut sheet, the unit H detects the amount of the remaining memory area presently unoccupied by the record data in the memory unit D. The unit I then controls the recording unit E to perform the recording operation for the corresponding cut sheet, with the selectively changed recording speed.

It is noted that the reception unit A continues receiving the image data from the remote facsimile at the reception speed corresponding to the initially set recording speed, regardless of the change in the recording speed from the initially set recording speed.

A facsimile machine according to a preferred embodiment of the present invention will be described while referring to the accompanying drawings wherein like parts and components are designated by the same reference numerals to avoid duplicating description.

The preferred embodiment describes a facsimile machine 1 according to the present invention which can record, on cut sheets, images corresponding to image data transmitted from a remote facsimile machine or read out by the facsimile machine 1 for copying operation.

Figure 2:
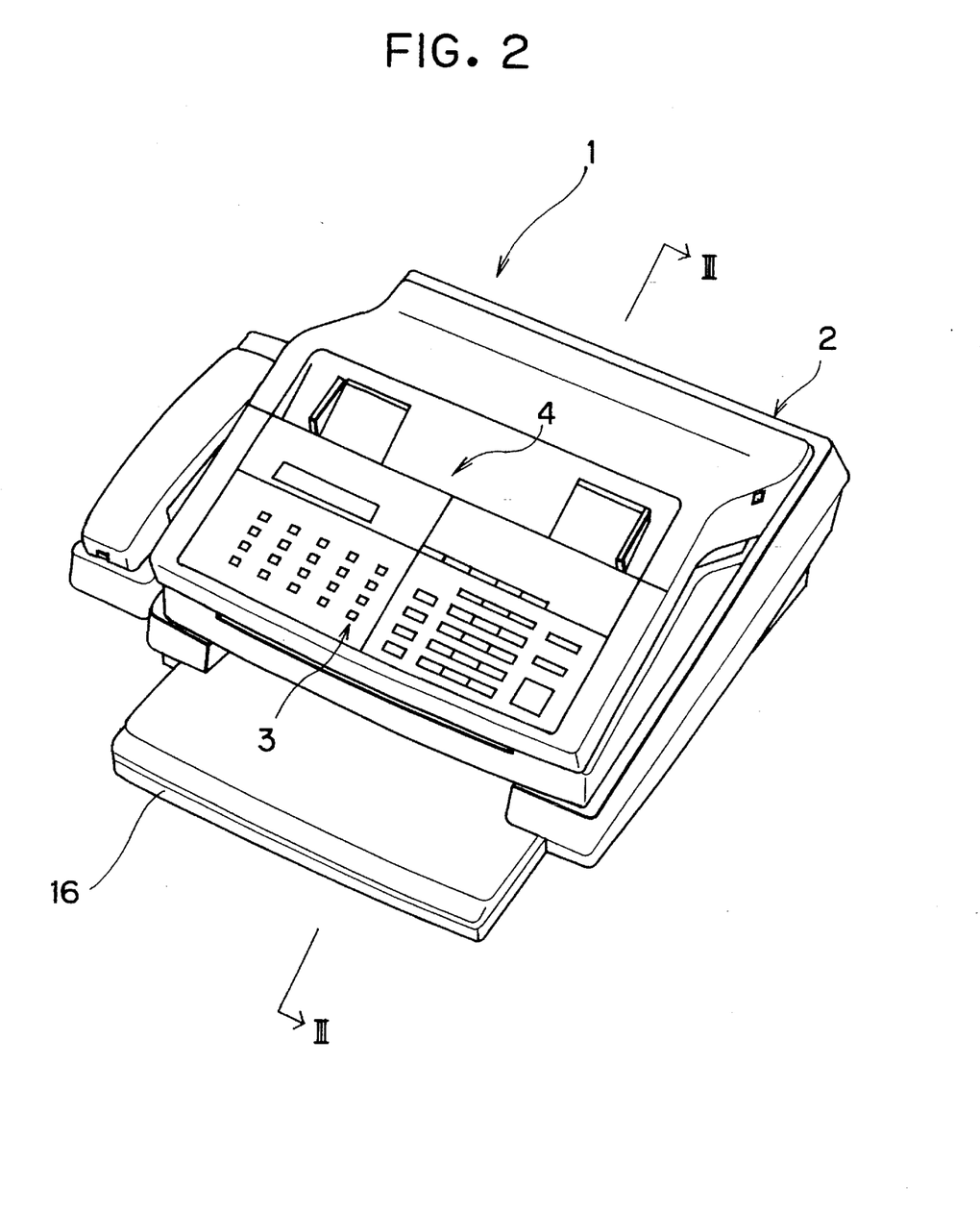
FIG. 2 is a perspective view showing overall structure of a facsimile machine according to an embodiment of the present invention.

The structure of the facsimile machine 1 will be described below while referring to FIGS. 2 and 3.

An operation panel 3 is provided on the upper front portion of the main frame 2 of the facsimile machine 1. A plurality of function keys, such as a transmit key, a copy key, a recording speed key, and a number key pad, for executing processes such as transmission, reception, and copying of document data are provided to the operation panel 3. A document tray 4 is provided directly behind the operation panel 3. The document tray 4 is provided for accepting single or stacked documents G to be transmitted or copied. The document tray 4 is adjustable to conform to a variety of different sized sheets, such as letter or A4 size sheets.

Figure 3:
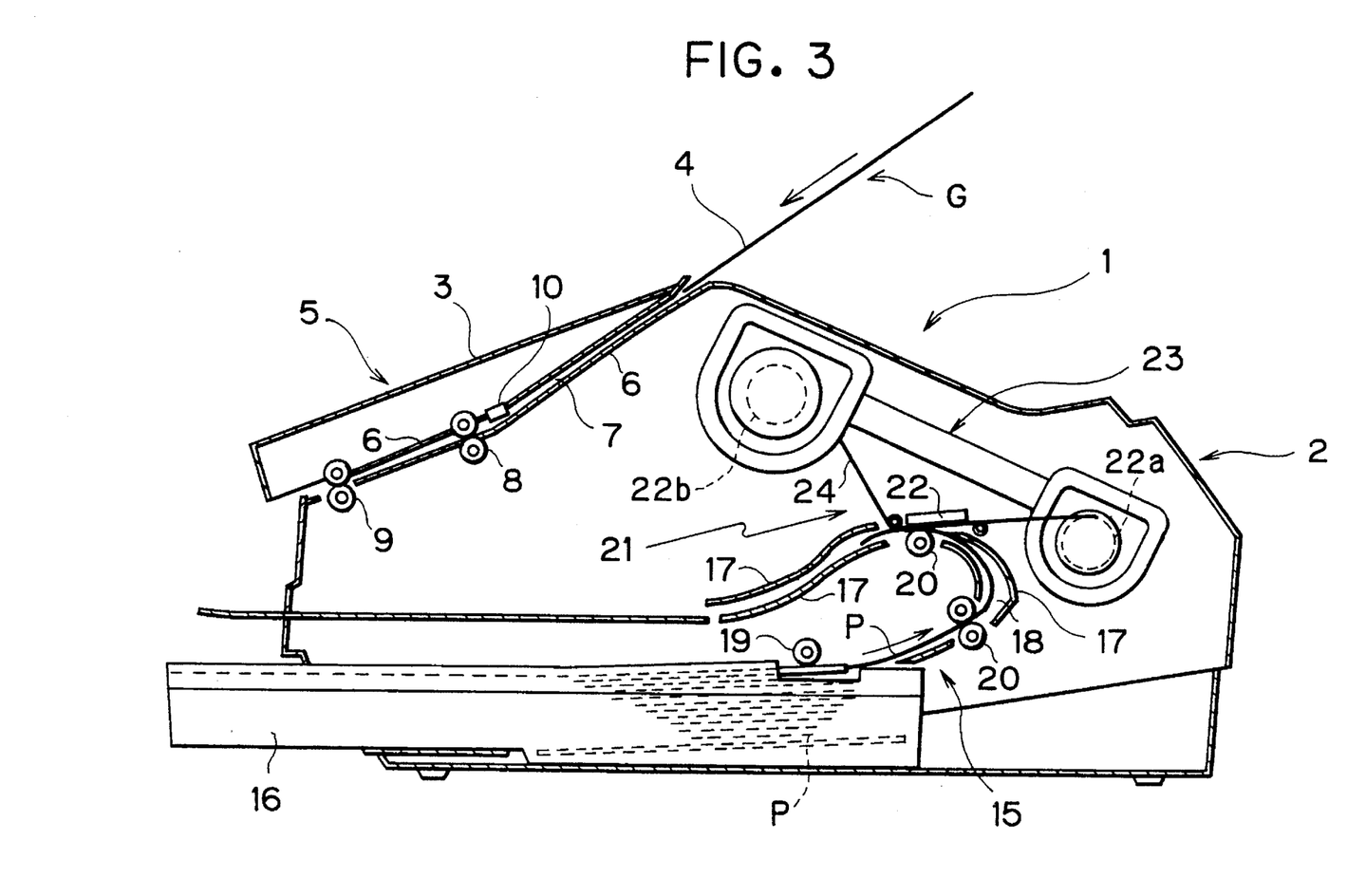
FIG. 3 is a sectional view taken along a line III—III of FIG. 2 showing an essential part of the facsimile machine of the embodiment.

Next, an explanation of a reading unit 5 for reading a document G set in the document tray 4 will be provided while referring to FIG. 3. The reading unit 5 is provided directly beneath the operation panel 3 in the interior of the frame 2. A plurality of guide walls 6 define a first sheet path 7 for guiding a document G set in the document tray 4 into and out of the facsimile machine 1. A pair of sheet supply rollers 8 for supplying a document G are provided essentially at a central portion of the first sheet path 7. A pair of discharge rollers 9 for discharging the document G are provided at a downstream portion (in regards to the flow of the document to be copied or transmitted) of the first sheet path 7. A document transport motor 35 shown in FIG. 4 is provided for rotating the sheet supply rollers 8 and the sheet discharge rollers 9 in synchronization in a sheet transport direction.

Figure 4:
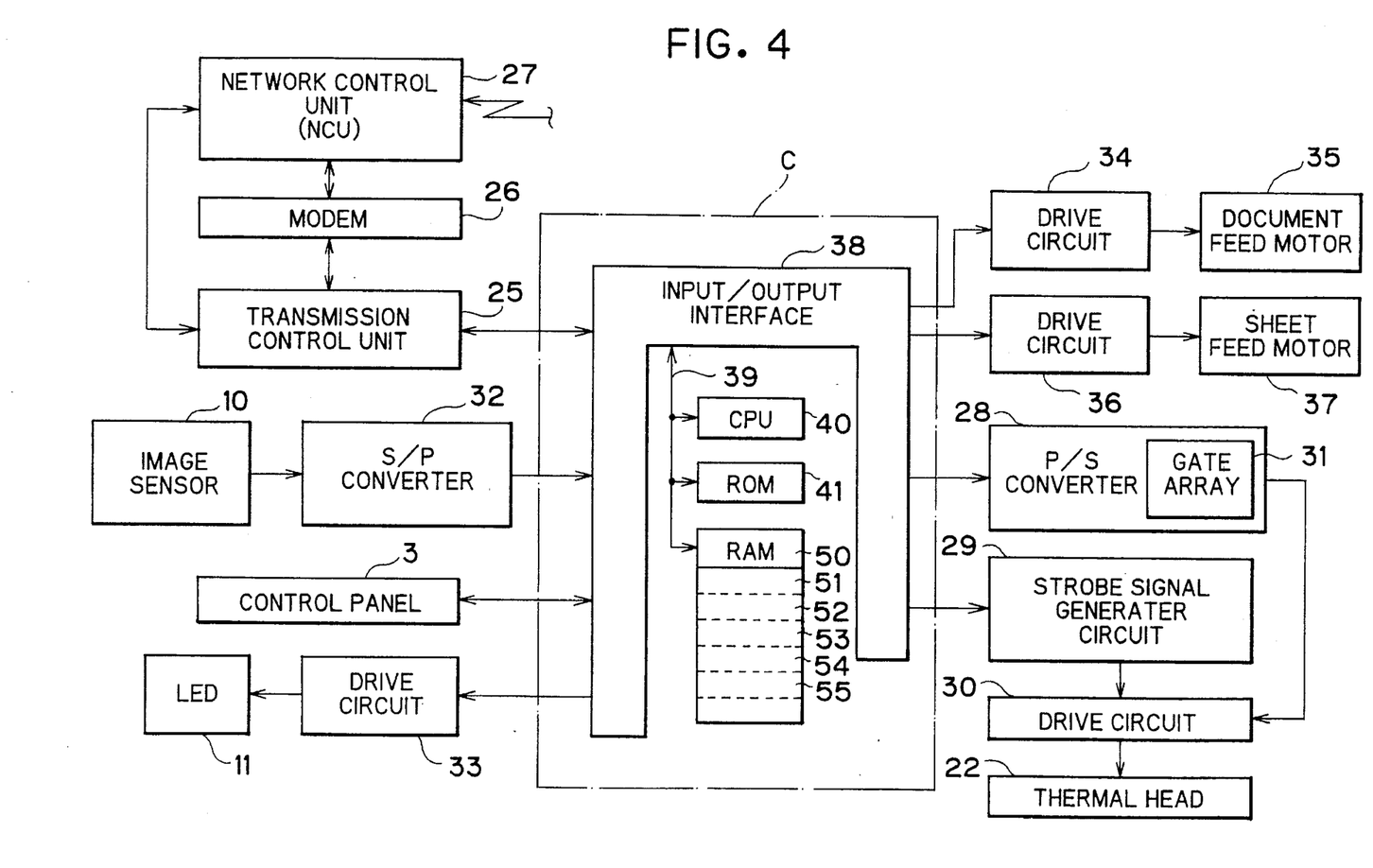
FIG. 4 is a block diagram showing a control system of the facsimile machine of the embodiment.

A light-emitting diode (LED) 11 shown in FIG. 4 as a read light source and an image sensor 10 are provided directly upstream from the sheet supply rollers 8 and positioned so as to face the first sheet path 7. The image sensor 10 is made from a charge coupled device (CCD) line image sensor, for example. The image sensor 10 accumulates electric charges via light emitted from the LED 11 and reflected from the document G so as to read each dot line of the document G. The image sensor then outputs line image data indicative of each dot line.

A transport unit 15 and a recording unit 21 are also provided to the interior of the frame 2. The transport unit 15 is for transporting a sheet P on which an image is to be recorded and includes a sheet cassette 16, a second guide path 18, a feed roller 19, a plurality of transport rollers 20 and a sheet feed motor 37. The sheet cassette 16 is detachably mounted to the lower interior portion of the frame 2. A stack of sheets P are stored in the sheet cassette 16. The sheets P can be various types of cut sheets, such as A4, B5, or letter size cut sheets. The second guide path 18 is formed from a plurality of guide walls 17 so as to extend in a substantially U-shape from the rear of the sheet cassette 16. The feed roller 19 is positioned at the start end of the second guide path 18 near the sheet cassette 16. The plurality of transport rollers 20 are provided along the second guide path 18. The sheet feed motor 37 shown in FIG. 4 is provided for rotating the feed roller 19 and the transport rollers 20, in synchronization, at a rotational speed determined dependently on a value of recording speed set through a recording speed setting operation of the present invention as will be described later.

The recording unit 21 is for recording, on the sheet P, an image corresponding to image data transmitted from a remote facsimile machine or the line image data obtained by the reading unit 5 to be copied from the document G. The recording unit 21 includes a thermal head 22 and a ribbon cassette 23. The thermal head 22 is positioned on the second guide path 18 in confrontation with one of the transport rollers 20. The thermal head 22 has a predetermined length along which are aligned in a row a plurality (for example, 1,728) of thermal elements. The ribbon cassette 23 is provided to the upper side of the second guide path 18. A ribbon supply spool 22a is rotatably supported in the ribbon cassette 23. A ribbon take-up spool 22b is provided in the ribbon cassette 23 on the side of the thermal head 22 opposite from the ribbon supply spool 22a. An ink ribbon 24 with a width corresponding to the length of the thermal head 22 is stored wound on the ribbon supply spool in the ribbon cassette 23 and supported between the ribbon supply spool 22a and the ribbon take-up spool 22b so as to be in contact with the thermal head 22.

With the above-described structures, the transport unit 15 and the recording unit 21 cooperate to perform a recording operation both in a reception mode and in a copy mode, as described below. The sheet P at the top of the stack in the sheet cassette 16 is supplied to the second guide path 18 by the feed roller 19. Then, the sheet P is transported through the second guide path by the transport rollers 20 at a transport speed determined corresponding to the recording speed set through the recording speed setting operation of the present invention. The recording unit 21 performs the recording operation to record dot images in line increments on the sheet P. More specifically, the sheet P is printed on using ink from the ink ribbon 24 and heat from the thermal head 22. The sheet P is then discharged out of the facsimile machine via the second guide path.

The control system of the facsimile machine 1 will be described below while referring to FIG. 4.

A transmission control unit 25 is individually connected to an input-output interface 38 of a control unit C, a transmission modem 26, and a network control unit (NCU) 27. The transmission control unit 25 is for controlling transmission operations when image data or a control signal received from the input-output interface 38 is transmitted to the modem 26, or when image data or a control signal received from the modem 26 is transmitted to the input-output interface 38. The modem 26 is for controlling modulation of transmission data of image data during transmission and demodulation of image data from a received transmission data during reception. The NCU 27 is for automatically controlling transmission of data to a remote facsimile machine and also reception of data from a remote facsimile machine.

A drive circuit 30 is provided for driving the thermal head 22. A strobe signal generator circuit 29 and a parallel/serial (P/S) converter 28 are individually connected to the drive circuit 30. A gate array 31 is provided to the P/S converter 28. The P/S converter 28 is for receiving record data parallely outputted from the input-output interface 38 and for serially supplying the record data to the drive circuit 30. The strobe signal generator circuit 29 is for supplying strobe signals to the drive circuit 30. Receiving the strobe signals, the drive circuit 30 drives the thermal head 22 in accordance with the record data supplied from the P/S converter 28. It is noted that the strobe signal generator circuit 29 is controlled by the control unit C to output the strobe signals at timings determined dependently on the recording speed set through the recording speed setting operation of the present invention.

Additionally, the transmission control unit 25, an S/P converter 32, the operation panel 3, drive circuits 33, 34 and 36, the P/S converter 28, and the strobe signal generator 29 are all individually connected to the input-output interface 38 of the control unit C. The S/P converter 32 is for converting serial image data outputted from the read sensor 10 into parallel image data. The drive circuit 33 is connected to the LED 11 for driving the LED 11. The drive circuit 34 is connected to the document feed motor 35 for driving the document feed motor 35. The drive circuit 36 is connected to the sheet feed motor 37 for driving the sheet feed motor 37. The drive circuit 36 is controlled by the control unit C to drive the sheet feed motor 37 to rotate the rollers 19 and 20 at the rotational speed corresponding to the recording speed set in the recording speed setting operation.

The control unit C includes basically a central processing unit (CPU) 40, the input-output interface 38, a ROM 41, and a RAM 50. A bus 39 such as a data bus connects the input-output interface 38 to the CPU 40, the ROM 41, and the RAM 50. The ROM 41 stores various control programs for controlling entire facsimile machine 1 to perform the transmission, reception and copy modes of operations. More specifically, the ROM 41 stores therein an encoding control program, a decoding control program, a developing control program, an image data memory unoccupied area amount detecting control program, a record data memory unoccupied area amount detecting control program, a recording speed setting control program, a recording control program, etc.

The encoding control program is for producing a compressed (encoded) transmission signal from the line image data obtained by the reading unit 5 from the document G. The decoding control program is for expanding (decoding) incoming coded image data transmitted from the remote facsimile machine. The developing control program is for developing the decoded image data into record data in the form of dot data. The image data memory unoccupied area amount detecting control program is for calculating an amount RM of an area unoccupied by the image data in the image data memory 51. More specifically, the image data memory unoccupied area amount detecting control program is for subtracting the amount of image data presently stored in an image data memory 51 from the maximum memory capacity of the image data memory 51. The record data memory unoccupied area amount detecting control program is for calculating an amount rM of an area unoccupied by the record data in the record data memory 53. More specifically, the record data memory unoccupied area amount detecting control program is for subtracting the amount of record data presently stored in an record data memory 53 from the maximum memory capacity of the record data memory 53. The recording speed setting control program is for setting a recording speed at which the recording unit 21 should perform the recording operation onto each cut sheet, dependently on the amounts of the unoccupied areas of the image data memory 51 and the record data memory 53. The recording control program is for controlling the thermal head 22 and the rollers 19 and 20 to cooperate to perform the recording operation at the recording speed set by the recording speed setting control program. More specifically, the recording control program is for controlling the strobe signal generation circuit 29 to produce the strobe signals at timings proper to cause the thermal head 22 to attain the set recording speed and for controlling the driving circuit 36 to cause the sheet feed motor 37 to rotate the rollers 19 and 20 so as to transmit the cut sheet P to the thermal head 22 and to feed the cut sheet P a pitch corresponding to the set recording speed, every time one line of dots is printed by the thermal head 22.

The facsimile machine 1 of this embodiment is capable of recording at five different recording speeds: a first through fifth recording speeds SP1–SP5. One of these recording speeds can be selected by manipulating the recording speed selection key on the panel 3. Various setting values of the different recording speeds SP1–SP5, such as threshold values Ma–Me and Na–Ne for the amounts of the unoccupied areas of the memories 51 and 53, flags F1–F5, and speed values, are stored in the ROM 41 in the form of a recording speed table as shown in Table 1.

TABLE 1

| Recording Speed | Recording Speed Content | Flag | Predetermined Value |
|---|---|---|---|
| First Recording Speed SP1 | 40 msec per line | F1 | Ma, Na |
| Second Recording Speed SP2 | 20 msec per line | F2 | Mb, Nb |
| Third Recording Speed SP3 | 10 msec per line | F3 | Mc, Nc |
| Fourth Recording Speed SP4 | 5 msec per line | F4 | Md, Nd |
| Fifth Recording Speed SP5 | 2.5 msec per line | F5 | None |

The first through fifth speeds SP1–SP5 have the following relative values:

SP1<SP2<SP3<SP4<SP5

The values Ma, Mb, Mc, and Md are threshold values predetermined for the amount of memory area unoccupied by the image data in the image data memory 51. The values Ma, Mb, Mc, and Md are set for the first through fourth speeds SP1–SP4, respectively. It is noted that no threshold value is predetermined to the fifth speed SP5. The values Ma, Mb, Mc, and Md have the following relative values:

Ma<Mb<Mc<Md

An exemplary value for the value Ma could be 6 kilobytes.

The values Na, Nb, Nc, and Nd are threshold values predetermined for the amount of memory area unoccupied by the record data in the record data memory 53. The values Na, Nb, Nc, and Nd are set for the first through fourth speeds SP1–SP4, respectively. It is noted that no threshold value is predetermined to the fifth speed SP5. The values Na, N, Nc, and Nd have the following relative values:

Na<Nb<Nc<Nd

An exemplary value for the value Na could be 3 kilobytes.

Memory area in the RAM 50 is subdivided into the image data memory 51, a decoded data memory 52, a record data memory 53, an encoded data memory 54, and a flag memory 55. The image data memory 51 is for sequentially storing the image data transmitted from the remote facsimile machine for several pages of document. For example, the image data memory 51 can store therein the image data of 256 kilobytes, at maximum. In other words, the capacity of the image data memory 51 is 256 kilobytes, for example. The decoded data memory 52 is for storing decoded image data which are obtained by successively retrieving the image data for respective line images from the image data memory 51 and by decoding the image data in accordance with the decoding control program. Each set of the decoded image data therefore represents a corresponding one of a plurality of line images constituting each one of the several pages of document. The decoded data memory 52 is also for storing the line image data obtained by the image sensor 10 during copy mode. The record data memory 53 is for storing record data which are obtained through successively retrieving the decoded image data for respective line images from the decoded data memory 52 and developing the decoded image data into dot data in accordance with the developing control program. Each set of the record data therefore represents a high resolution dot image of a corresponding one of a plurality of line images constituting each one of the several pages of document. The encoded data memory 54 is for storing encoded image data which are obtained by the reading unit 5 and are encoded in accordance with the encoding control program during transmission.

The flag memory 55 is for storing flag data for the first through fifth recording speed flags F1 through F5. The first recording speed flag F1 is set when the first recording speed is set (when data is "1"). The second recording speed flag F2 is set when the second recording speed is set. The third recording speed flag F3 is set when the third recording speed is set. The fourth recording speed flag F4 is set when the fourth recording speed is set. The fifth recording speed flag F5 is set when the fifth recording speed is set. Additionally, various memories are provided in the RAM 50 for temporarily storing the results of the calculations performed at the CPU 40.

The facsimile machine 1 having the above-described structure operates, as will be described below.

In the transmission mode, the CPU 40 controls the driving circuits 33 and 34 to cause the reading unit 5 to read out the original document G. The image sensor 10 serially outputs a plurality of line image data indicative of the plurality of line images of the document G to the S/P converter 32. The S/P converter 32 parallely supplies the line image data to the interface 38 of the control unit C. The line image data are temporarily stored in the memory 52. The CPU 40 then encodes the line image data into encoded data according to the encoding control program stored in the ROM 41. The encoded data are temporarily stored in the encoded data memory 54. The control unit C then controls the transmission control unit 25 to transmit the encoded data to a remote facsimile machine, with the use of the modem 26 and the network control unit 27.

In the copy mode, similarly to the transmission mode, the line image data are obtained to be stored in the data memory 52. The control unit C parallely supplies the line image data into the P/S converter 28, which in turn serially outputs the line image data into the drive circuit 30. The control unit C controls the driving circuit 36 and the strobe signal generator circuit 29 to cooperate to perform the recording operation for recording an image with the line image data. As a result, an image the same as the image on the document G is recorded on the cut sheet P.

In the reception mode, an operator manipulates the recording speed selection key on the operation panel 3 to select a desired recording speed from the five recording speeds SP1–SP5 stored in the table 1 in the ROM 41. The control unit C controls, via the transmission control unit 25, the network control unit 27 to cause coded image data to be transmitted from the remote facsimile machine to the facsimile machine 1 at a transmission speed corresponding to the selected recording speed. Now, assume that the remote facsimile machine transmits, to the facsimile machine 1, image data of a plurality of pages of document. The image data of the respective ones of the plurality of pages of document are consecutively received by the modem 26 and are transmitted through the transmission control unit 25 to the image data memory 51. Thus, the image data for the respective pages of document are consecutively inputted to the image data memory 51.

The CPU 40 then consecutively retrieves, from the image data memory 51, the image data for respective ones of a plurality of line images constituting the first page of the document. The CPU then decodes the retrieved image data into decoded image data in accordance with the decoding control program stored in the ROM 41. The decoded image data for the respective line images of the first page are then sequentially stored in the decoded data memory 52.

The CPU 40 then consecutively retrieves, from the decoded data memory 52, the decoded image data for the respective line images. The CPU then develops, in accordance with the developing control program, the decoded image data into record data which are in the form of dot data indicative of the corresponding line images of high dot density. The CPU then consecutively stores, into the record data memory 53, the record data indicative of the respective line dot images.

Then, the CPU 40 starts performing the recording operation for the first page in accordance with the recording control program. More specifically, the CPU actuates the motor 37 no rotate the feed roller 19 to supply a cut sheet P to the recording unit 21. The CPU controls to consecutively retrieve the record data for the respective line images for the first page from the memory 53 and to supply them to the drive circuit 30 via the P/S converter 31. The CPU controls the strobe signal generator circuit 29 to output the strobe signals at timings corresponding to the recording speed initially selected by the operator. Thus, the drive circuit 30 drives the thermal head 22 in accordance with the supplied record data representative of the. respective line images, to print the line dot images on the sheet P, one after another. The motor 37 rotates the transport rollers 20 to transport the sheet P, at a pitch. every line increment of the sheet P. Thus, the recording corresponding to the operator's selected recording speed, for unit 21 and the transport unit 15 cooperate to print the first page at the operator's selected recording speed.

When entire part of the first sheet P is recorded on, the recording operation by the recording unit 21 is interrupted. More specifically, the CPU controls the strobe signal generator circuit 29 to stop outputting the strobe signals. While the recording operation is thus interrupted, the transport rollers 20 transports the printed first sheet P to be discharged out onto a discharged sheet tray, and the feed roller 19 supplies a new sheet (a second sheet P) to the recording unit 21. During this period that the recording operation is interrupted, the CPU 40 starts performing the recording speed setting operation of the present invention for determining the recording speed for recording the second page, as will be described below.

In the recording speed setting operation, first, the CPU 40 operates in accordance with the image data memory unoccupied area amount detecting control program. More specifically, the CPU 40 subtracts the amount of the area of the memory 51 presently filled with the image data from the memory capacity amount of the memory 51. Thus, the amount RM of the area in the memory 51 unoccupied by the image data are calculated. Then, the CPU 40 subtracts the amount of the area of the memory 53 presently filled with the record data from the memory capacity amount of the memory 53. Thus, the amount rM of the area in the memory 53 unoccupied by the record data are calculated.

Figure 5:
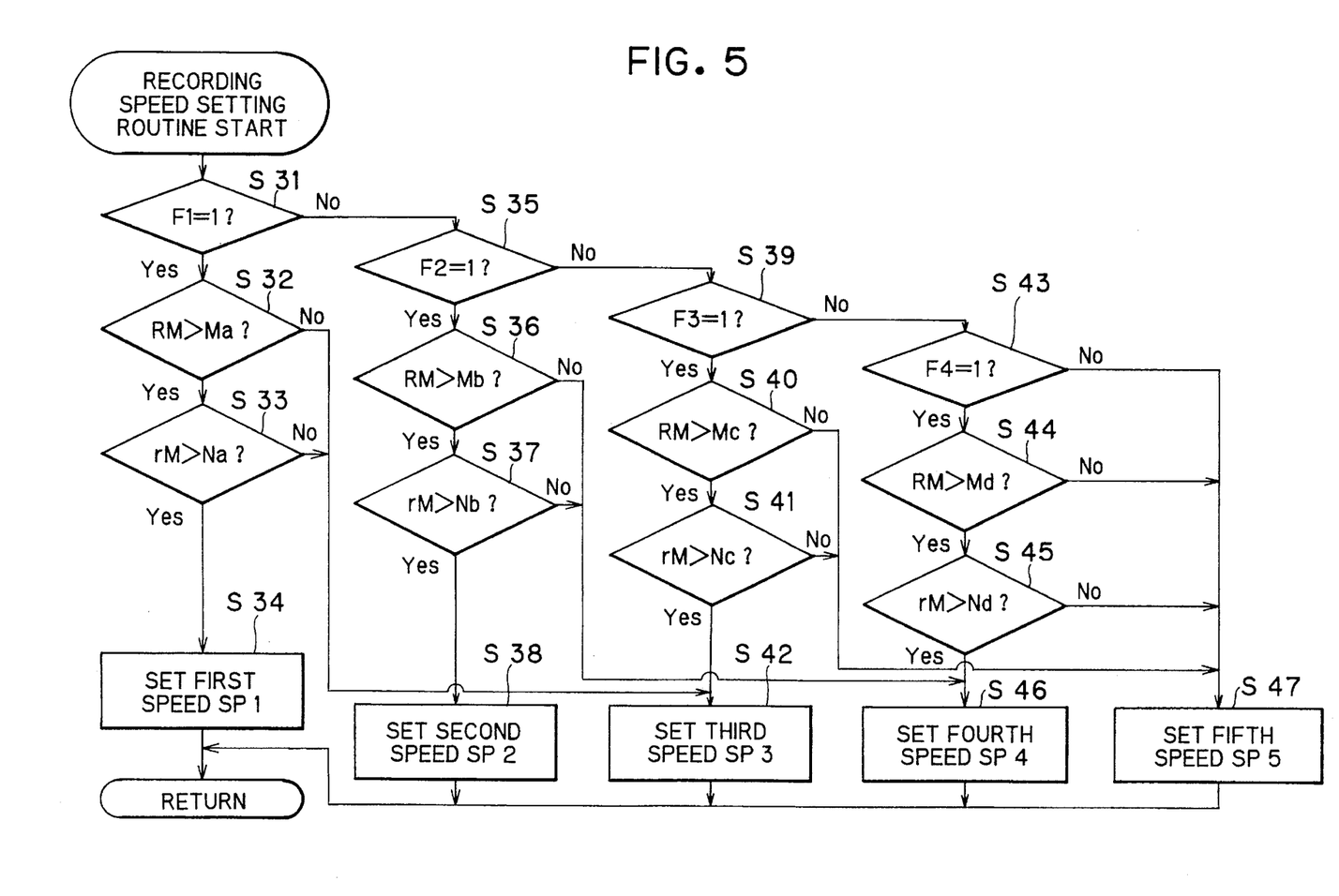
FIG. 5 is a flow chart of a recording speed setting routine conducted in the facsimile machine of the embodiment.

Then, the CPU performs the control routine shown in FIG. 5. The CPU first judges whether the first recording speed flag F1 is set, that is, whether the first recording speed SP1 is initially selected, in step S31, based on the flag data of the recording speed flags F1 through F5 stored in the flag memory 55. If so (i.e., step S31 is "YES"), the routine proceeds to step S32 where the CPU judges whether the calculated value RM is greater than the threshold value Ma set to the first speed SP1. If so (i.e., step S32 is "YES"), the routine proceeds to step S33 where the CPU further judges whether the amount rM is greater than the threshold value Na set to the first speed SP1. If so (i.e., step S33 is "YES"), the first recording speed is unchanged to be set, control is finished, and the recording speed setting operation is completed. In other words, it is determined that the recording control for the second page should be executed at the first recording speed (40 msec/line) based on the information in the recording speed table. On the other hand, if the amount RM is equal to or less than the threshold value Ma (i.e., step S32 is "NO"), or even if the value RM is greater than the threshold value Ma, but the value rM is equal to or less than the threshold value Na (i.e. step S32 is "YES," but step S33 is "NO"), the routine proceeds to step S42 where the recording speed is reset two recording speeds higher to the third recording speed SP3. The control is then completed and it is determined that recording control for the second page should be performed at the third recording speed (10 msec/line).

On the other hand, if the second recording speed flag F2 is initially set (, i.e.,, step S31 is "NO" and step S35 is "YES"), the routine proceeds to step S36 where the CPU judges whether the value RM is greater than the threshold value Mb. If so (i.e., step S36 is "YES"), the routine proceeds to step S37 where the CPU judges whether the value rM is greater than the threshold value Nb. If so (i.e., step S37 is "YES"), the second recording speed (20 msec/line) is unchanged to be set, and control is finished. Thus, it is determined that recording control for the second page should be executed at the second recording speed. On the other hand, if the value RM is equal to or less than the threshold value Mb (i.e., step S36 is "NO"), or even if the amount RM is greater than the threshold value Mb, but the value rM is equal to or less than the threshold value Nb (i.e. step S36 is "YES," but step S37 is "NO"), the routine proceeds to step S46 where the recording speed is reset two higher recording speeds to the fourth recording speed SP4. The control is then completed, and it is determined that recording control for the second page should be performed at the fourth recording speed (5 msec/line) .

If the third recording speed flag F3 is initially set, (i.e., step S31 and step S35 are "NO" and step S39 is "YES"), the routine proceeds to step S40 where the CPU judges whether the value RM is greater than the threshold value Mc. If so (i.e., step S40 is "YES"), the routine proceeds to step S41 where the CPU judges whether the value rM is greater than the threshold value Nc. If so (i.e., step S41 is "YES"), the third recording speed SP3 is set and control is finished. It is therefore determined that the recording control for the second page should be executed at the third recording speed. On the other hand, if the value RM is equal to or less than the threshold Mc (i.e., step S40 is "NO"), or even if the value RM is greater than the threshold value Mc, but the value rM is equal to or less than the threshold value Nc (i.e. step S40 is "YES," but step S41 is "NO"), the routine proceeds to step S47 where the recording speed is reset two recording speeds higher to the fifth recording speed SP5 (2.5 msec/line). The control is then completed, and it is determined that the recording control for the second page should be performed at the fifth recording speed.

If the fourth recording speed flag F4 is initially set, (i.e., step S31, step S35, and step S39 are "NO" and step S43 is "YES"), the routine proceeds to step S44 where the CPU judges whether the value RM is greater than the threshold Md. If so (i.e., step S44 is "YES"), the routine proceeds to step S45 where the CPU judges whether the value rM is greater than the threshold Nd. If so (i.e., step S45 is "YES"), the fourth recording speed is set and control is finished. It is therefore determined that the recording control for the second page should be executed at the fourth recording speed SP4. On the other hand, if the value RM is equal to or less than the threshold Md (i.e., step S44 is "NO"), or even if the value RM is greater than the threshold Md, but the value rM is equal to or less than the threshold value Nd (i.e. step S44 is "YES," but step S45 is "NO"), the routine proceeds to step S47 where the recording speed is reset to the fifth recording speed SP5 (2.5 msec/line). The control is then completed, and recording control for the second page is determined to be performed at the fifth recording speed SP5.

If the fifth recording speed flag F5 is initially set, (i.e., step S31, step S35, step S39, and step S43 are "NO"), the routine proceeds to step S47 where the fifth recording speed is unchanged to be set. Printing for the second page is therefore determined to be performed at the fifth recording speed.

When the recording speed setting operation for the second page is thus completed, the CPU 40 starts performing the recording operation for the second sheet P in accordance with the recording control program. At this time, the second sheet P has been already transmitted to the recording unit 21. The CPU 40 therefore controls to consecutively retrieve the record data for the respective line images for the second page from the memory 53 and to supply them to the drive circuit 30 via the P/S converter 31. The CPU controls the strobe signal generator circuit 29 to output the strobe signals at timings corresponding to the recording speed set in the above-described recording speed setting operation. Thus, the drive circuit 30 drives the thermal head 22 in accordance with the supplied record data representative of the respective line images, to print the line dot images on the sheet P, one after another. The motor 37 rotates the transport rollers 20 to transport the sheet P, at a pitch corresponding to the recording speed set in the above-described recording speed setting operation, for every line increment of the sheet P. Thus, the recording unit 21 and the transport unit 15 cooperate to print the second page at the set recording speed.

When entire part of the second sheet P is recorded on, the recording operation by the recording unit 21 is again interrupted. The CPU controls the strobe signal generator circuit 29 to stop outputting the strobe signals. While the recording operation is thus interrupted, the transport rollers 20 transports the printed second sheet P to be discharged out onto a discharged sheet tray, and the feed roller 19 supplies a new sheet (a third sheet P) to the recording unit 21.

During this period, the recording speed setting operation is again performed for the third page P. More specifically, the CPU calculates to subtract the amount of the area of the memory 51 presently filled with the image data from the memory capacity amount of the memory 51, so as to calculate the amount RM of the area in the memory 51 unoccupied by the image data. Then, the CPU 40 subtracts the amount of the area of the memory 53 presently filled with the record data from the memory capacity amount of the memory 53, so as to obtain the amount rM of the area in the memory 53 unoccupied by the record data. Then, the CPU performs the control routine shown in FIG. 5. Then, the recording speed at which the third sheet P should be recorded is determined, and the recording unit 21 and the transport unit 15 again cooperate to record the record data on the third sheet P at the recording speed newly set for the third sheet.

Thus, immediately before when each of the second and succeeding pages P are recorded by the recording unit 21 and the transport unit 15, the amounts RM and rM are detected and the recording speed setting routine of FIG. 5 is conducted to determine the recording speed at which the corresponding page P should be recorded. The second and succeeding sheets P are therefore recorded at the thus determined recording speeds, respectively. When the remaining area amount RM of the area unoccupied by the image data in the memory 51 is small, the recording speed is reset from the initially selected speed to a higher one. Similarly, when the remaining area amount rM of the area unoccupied by the record data in the memory 53 is small, the recording speed is reset from the initially selected speed to a higher one. When the recording speed is thus reset to a higher value, the record data are retrieved from the record data memory 53 to be supplied to the drive circuit 30 more quickly. As a result, it becomes possible to prevent the memory 53 from being fully filled with the record data. It therefore becomes possible to prevent the encoding or developing processes to produce the record data from being interrupted. Accordingly, it becomes possible to prevent the memory 51 from being fully filled with the image data. It therefore becomes possible to prevent cut offs of incoming image data.

It is noted that the recording speed is set for each cut sheet. Accordingly, entire area of each cut sheet is recorded at a uniform recording speed set for the corresponding cut sheet. Each cut sheet is therefore recorded with dot images having a uniform image density and therefore providing a good appearance.

It is further noted that the threshold values Ma through Md and Na through Nd increase, as the reception speed, determined by the initially selected recording speed, increases, at which the image data is transmitted into the facsimile machine 1. When the remaining memory area amount RM is equal to or less than a corresponding threshold value or when the remaining memory area amount rM is equal to or less than a corresponding threshold value, the recording speed is reset to a higher recording speed. The recording unit 21 records the record data stored in the recording data memory 53 at the higher speed for the corresponding cut sheet. Accordingly, the record data memory 53 will not fill up, and the decoding processes of the image data in the image data memory 51 are satisfactorily performed without being interrupted. Accordingly, the image data memory 51 will not fill up regardless of how fast the transmission speed is set and how complicated the decoding processes are. Therefore, cut offs of incoming data caused by a full image data memory 51 can be prevented.

Additionally, because recording is performed at high speeds at cut sheet units, images are recorded on each cut sheet at a uniform density.

While the present invention has been described with reference to a specific embodiment thereof, it would be apparent to those skilled in the art that various changes and modifications may be made therein without departing from the spirit of the invention.

For example, during the recording speed setting control, steps S33, S37, S41, and S45 can be omitted and recording speed can be changed to a higher recording speed only when the value RM is equal to or less than a predetermined threshold value. Alternatively, steps S32, S36, S40, and S44 can be omitted and recording speed can be changed to a higher recording speed only when the value rM is equal to or less than a predetermined threshold value. The predetermined threshold values Ma, Mb, Mc, and Md for the amount RM can be set to the same value.

Also, the predetermined threshold values Na, Nb, Nc, and Nd for the amount rM can be set to the same value.

The recording speed can be set to only the next faster speed, rather than two speeds faster as described above, when the value rM is equal to or less than the predetermined threshold value or when the value RM is equal to or less than the predetermined threshold value.

In the above-described embodiment, the first page is recorded at the initially selected recording speed. However, before when the first page is recorded, the amounts RM and rM may be detected and the recording speed setting routine of FIG. 5 may be performed to determine the recording speed at which the first page should be recorded. The first page may also be recorded with the recording speed thus set through the recording speed setting operation.

The present invention can be applied to facsimile machines provided with a variety of different recording units, such as thermal types or laser types.

What is claimed is:

1. A facsimile machine, capable of receiving image data from a remote facsimile machine representative of an image of at least one page of document and recording the image of the at least one page of document onto at least one cut sheet, comprising:

reception means for receiving image data representative of an image of at least one page of document transmitted from a remote facsimile machine at a fixed reception speed;

first memory means for temporarily storing the image data supplied from the reception means;

decoding means for decoding the image data retrieved from the first memory means into record data;

second memory means for temporarily storing the record data obtained by the decoding means;

recording means for performing a recording operation for each of at least one cut sheet with the record data, at an initial recording speed having a value corresponding to the reception speed, to thereby record the image of the at least one page of document onto the at least one cut sheet, respectively;

memory unoccupied area amount detection means for detecting at least one of the amount of a remaining memory area in the first memory means unoccupied by the image data or the amount of a remaining memory area in the second memory means unoccupied by the record data;

recording speed changing means for selectively changing the value of a recording speed, at which the recording means performs the recording operation for each of the at least one cut sheet, to another value faster than the initial value when either of the first memory unoccupied area amount or the second memory unoccupied area amount detected by the memory unoccupied area amount detection means is equal to or less than a corresponding one of first and second predetermined threshold values, respectively, the recording speed changing means controlling the recording means to perform the recording operation for a corresponding one of the at least one cut sheet, at the selectively changed recording speed, wherein the recording speed changing means includes comparing means for comparing at least one of the detected first memory unoccupied area amount or the second memory unoccupied area amount with the corresponding one of the predetermined first and second threshold values;

speed value storing means for storing a plurality of different values of the recording speed;

first threshold value storing means for storing a plurality of different values of the first threshold value which correspond to the plurality of different values of the recording speed, respectively;

second threshold value storing means for storing a plurality of different values of the second threshold value which correspond to the plurality of different values of the recording speed, respectively; and initially setting means for initially setting one of the plurality of different values as the recording speed, at which the recording means performs the recording operation, the initially setting means controlling the reception means to receive the image data from the remote facsimile machine at the reception speed corresponding to the initially set value, the initially setting means controlling the comparing means of the recording speed changing means to compare the detected first memory unoccupied area amount with one of the plurality of values of the first threshold values corresponding to the initially set value of the recording speed and to compare the second memory unoccupied area amount with one of the plurality of values of the second threshold values corresponding to the initially set value of the recording speed, the recording speed changing means selectively changing the initially set value of the recording speed to another value that is another one of the plurality of values stored in the speed value storing means faster than the initially set value when at least one of the detected first memory unoccupied area amount and second memory unoccupied area amount is equal to or less than the corresponding value of the first and second predetermined threshold values.

2. A facsimile machine of claim 1, wherein the memory unoccupied area amount detection means detects at least one of the amount of the remaining memory area in the first memory means or the amount of the remaining memory area in the second memory means, immediately before the recording means performs the recording operation for each of the at least one of the at least one cut sheet, and wherein the recording speed changing means selectively changes the value of the recording speed, at which the recording means performs the recording operation for the corresponding one of the at least one of the at least one cut sheet, to the another value faster than the value when at least one of the first memory unoccupied area amount or the second memory unoccupied area amount detected by the memory unoccupied area amount detection means is equal to or less than the corresponding one of the first and second predetermined threshold values, the recording speed changing means controlling the recording means to perform the recording operation for the corresponding cut sheet at the selectively changed recording speed.

3. A facsimile machine of claim 1, wherein the memory unoccupied area amount detection means includes:

first memory unoccupied area amount detection means for subtracting the data amount of the image data presently stored in the first memory means from the memory capacity of the first memory means, to thereby calculate the amount of the remaining memory area; and second memory unoccupied area amount detection means for subtracting the data amount of the record data presently stored in the record memory means from the memory capacity of the second memory means, to thereby calculate the amount of the remaining memory area.

4. A facsimile machine of claim 1, wherein the memory unoccupied area amount detection means detects at least one of the amount of the remaining memory area in the first memory means and the amount of the remaining memory area in the second memory means, immediately before the recording means performs the recording operation for each of the at least one cut sheet, wherein the recording speed changing means selectively changes the value of the recording speed, at which the recording means performs the recording operation for the corresponding one of the at least one cut sheet, to another value faster than the value when at least one of the first memory unoccupied area amount detected by the memory unoccupied area amount detection means is equal to or less than the corresponding one of the first and a second predetermined threshold values, the recording speed changing means controlling the recording means to perform the recording operation for the corresponding cut sheet at the selectively changed recording speed.

5. A facsimile machine of claim 1, wherein the memory unoccupied area amount detection means includes:

first memory unoccupied area amount detection means for subtracting the data amount of the image data presently stored in the first memory means from the memory capacity of the first memory means, to thereby calculate the amount of the remaining memory area; and second memory unoccupied area amount detection means for subtracting the data amount of the record data presently stored in the record memory means from the memory capacity of the second memory means, to thereby calculate the amount of the remaining memory area.

6. A facsimile machine, capable of receiving from a remote facsimile machine image data representative of images of a plurality of pages of document and recording the images of the plurality of pages of document onto a plurality of cut sheets, comprising:

recording speed setting means for setting a recording speed into an initial set value;

receiving means for consecutively receiving image data representative of the images of a plurality of pages of document transmitted from a remote facsimile machine at a reception speed corresponding to the initial set value of the recording speed;

first memory means for temporarily storing the image data consecutively received by the receiving means;

processing means for consecutively retrieving, from the first memory means, the image data representative of respective ones of a plurality of line images constituting each of the plurality of pages of document and for processing the image data into line image data;

second memory means for temporarily storing the line image data for each one of the plurality of line images constituting each of the plurality of pages of document;

retrieving means for consecutively retrieving, from the second memory means, the line image data for respective ones of the plurality of line images constituting each of the plurality of pages of document;

recording means for consecutively recording the respective ones of the plurality of line images constituting each of the plurality of pages of document, onto a corresponding one of the plurality of cut sheets, in accordance with the corresponding line image data, at the recording speed;

judging means for judging whether the amount of the area in the first memory means occupied by the image data has a value equal to or higher than a first predetermined value, immediately before the recording means starts recording an image of each of at least one of the plurality of pages of document onto a corresponding one of the plurality of cut sheets; and recording speed resetting means for resetting the recording speed, at which the recording means records the respective ones of the plurality of line images constituting corresponding one of the at least one of the plurality of pages of document onto a corresponding one of the at least one of the plurality of cut sheets, from the initial set value into a value higher than the initial set value while maintaining the reception speed to be fixed, if the judging means determines that the amount of the area of the first memory means occupied by the image data has the value equal to or higher than the first predetermined value.

7. A facsimile machine of claim 6, wherein said recording speed setting means includes:

recording speed value storing means for storing a plurality of the initial set values of the recording speed; and recording speed value selecting means for selecting one of the plurality of the initial set values of the recording speed, and wherein said receiving means receives the image data for the plurality of pages of document transmitted from the remote facsimile machine at the reception speed corresponding to the initial set value of the recording speed selected by the recording speed value selecting means.

8. A facsimile machine of claim 6, wherein the recording speed resetting means resets the recording speed, at which the recording means records the respective ones of the plurality of line images constituting each of the at least one of the plurality of pages of document onto a corresponding one of the at least one of the plurality of cut sheets, from the one of the plurality of initial set values selected by the recording speed value selecting means into another one of the plurality of initial set values stored in the recording speed value storing means which is higher than the selected initial set value, if the judging means determines that the amount of area of the first memory means occupied by the image data has the value equal to or higher than the first predetermined value.

9. A facsimile machine of claim 6, further comprising additional judging means for judging whether the amount of the area in the second memory means occupied by the line image data has a value equal to or higher than a second predetermined value immediately before when the recording means starts recording an image of each of at least one of the plurality of pages of document onto a corresponding one of the plurality of cut sheets, wherein the recording speed resetting means resets the recording speed from the initial set value into a value higher than the initial set value while maintaining the reception speed to be fixed when the judging means determines at least one of the facts that the amount of area of the first memory means occupied by the image data has the value equal to or higher than the first predetermined value and that the amount of area of the second memory means occupied by the line image data has the value equal to or higher than the second predetermined value.

10. A facsimile machine of claim 6, wherein said processing means includes:

decoding means for consecutively decoding the image data for the respective ones of the plurality of line images constituting each of the plurality of pages of document into decoded data; and developing means for developing the decoded data into the line image data representative of dot images of the corresponding line images.

11. A facsimile machine, capable of receiving image data from a remote facsimile machine representative of images of at least one page of document and recording the images of the at least one page of document onto at least one cut sheet, comprising:

reception means for receiving image data representative of images of at least one page of document transmitted from a remote facsimile machine at a fixed reception speed;

first memory means for temporarily storing the image data representative of an image of at least one page of document supplied from the reception means;

decoding means for decoding the image data retrieved from the first memory means into record data;

second memory means for temporarily storing the record data obtained by the decoding means;

recording means for performing a recording operation for each of at least one cut sheet with the record data, at an initial recording speed corresponding to the reception speed, to thereby record the image of the at least one page of document onto the at least one cut sheet, respectively;

memory unoccupied area amount detection means for detecting at least one of the amount of a remaining memory area in the first memory means unoccupied by the image data and the amount of a remaining memory area in the second memory means unoccupied by the record data, immediately before the recording means starts performing the recording operation for each of at least one of the at least one cut sheet;

recording speed changing means for selectively changing the recording speed at which the recording means performs the operation for the corresponding one of the least one cut sheet, from the initial value corresponding to the reception speed to another value faster than the initial value, if either the first memory unoccupied area amount or the second memory unoccupied area amount detected by the memory unoccupied area amount detection means is equal to or less than a corresponding one of the first and second predetermined threshold values, respectively, the recording speed changing means controlling the recording means to perform the recording operation for the corresponding cut sheet at the selectively changed recording speed, wherein the recording speed changing means controls the recording means to perform the recording operation for the corresponding cut sheet at the selectively changed recording speed, while maintaining the reception speed to be fixed.

* * * * *